(12) United States Patent
Shipman et al.

(10) Patent No.: US 12,241,016 B2
(45) Date of Patent: Mar. 4, 2025

(54) HIGH TEMPERATURE HIGH SALT LOW END RHEOLOGY MODIFIERS

(71) Applicants: CNPC USA CORPORATION, Houston, TX (US); Beijing Huamei Inc., Beijing (CN); CHINA NATIONAL PETROLEUM CORPORATION, Beijing (CN)

(72) Inventors: Janine Shipman, Houston, TX (US); Meng Lu, Sugar Land, TX (US); Weibin Zha, Spring, TX (US)

(73) Assignees: CNPC USA Corporation, Houston, TX (US); Beijing Huamei, Inc., Beijing (CN); China National Petroleum Corporation, Beijing (CN)

( * ) Notice: Subject to any disclaimer, the term of this patent is extended or adjusted under 35 U.S.C. 154(b) by 0 days.

(21) Appl. No.: 17/818,155

(22) Filed: Aug. 8, 2022

(65) Prior Publication Data
US 2024/0043734 A1 Feb. 8, 2024

(51) Int. Cl.
*C09K 8/24* (2006.01)
*C09K 8/14* (2006.01)

(52) U.S. Cl.
CPC .............. *C09K 8/24* (2013.01); *C09K 8/145* (2013.01)

(58) Field of Classification Search
CPC ................... C09K 8/24; C09K 8/145
See application file for complete search history.

(56) References Cited

U.S. PATENT DOCUMENTS

| | | |
|---|---|---|
| 7,517,835 B2 | 4/2009 | Horton et al. |
| 8,017,563 B2 | 9/2011 | Freeman |
| 8,288,324 B2 | 10/2012 | Sunkara |
| 8,623,790 B2 | 1/2014 | Breeden et al. |
| 8,689,869 B2 | 4/2014 | Shindgikar et al. |
| 10,023,782 B2 | 7/2018 | Wang et al. |
| 10,072,197 B2 | 9/2018 | Lu et al. |
| 10,577,444 B2 | 3/2020 | Kadir et al. |
| 10,988,660 B2 | 4/2021 | Merli et al. |
| 10,988,676 B1 * | 4/2021 | Patil ............... C08L 33/14 |
| 2011/0114318 A1 * | 5/2011 | Ezell ............... C09K 8/512 166/305.1 |
| 2011/0130965 A1 | 6/2011 | Slater et al. |
| 2012/0157353 A1 | 6/2012 | Breeden et al. |
| 2014/0182369 A1 | 7/2014 | Blue et al. |
| 2018/0266197 A1 | 9/2018 | Amanullah et al. |
| 2018/0346804 A1 * | 12/2018 | Blazewicz ........... C09K 8/5756 |
| 2020/0040248 A1 | 2/2020 | Kippie |

FOREIGN PATENT DOCUMENTS

| | | |
|---|---|---|
| AU | 2011343385 B2 | 6/2012 |
| BR | 112020026539-0 A2 | 3/2021 |
| CN | 204422525 U | 6/2015 |
| JP | 2014-504319 A | 2/2014 |
| WO | 2012/087354 A1 | 6/2012 |
| WO | 2013162902 A1 | 10/2013 |
| WO | 2016100183 A1 | 6/2016 |
| WO | 2019203810 A1 | 10/2019 |
| WO | WO 2021-162712 A1 | 8/2021 |

OTHER PUBLICATIONS

Huang (Huang, Xian-Bin et al, Laponite: a promising nanomaterial to formulate high-performance water-based drilling fluids, Petroleum Science, 2021, 18, 579-590).*
Trinternational, Inc. (Jun. 4, 2020). 2-acrylamido-2-methylpropane sulfonic acid supplier distributor. Trinternational, Inc. 2-Acrylamido-2-Methylpropane Sulfonic Acid. Retrieved Nov. 19, 2021, from https://www.trichemicals.com/products/2-acrylamido-2-methylpropane-sulfonic-acid/.
Wikipedia. (Apr. 17, 2021). 2-Acrylamido-2-methylpropane sulfonic acid. 2-Acrylamido-2-methylpropane sulfonic acid—Wikipedia. Retrieved Nov. 18, 2021, from Retrieved from "https://en.wikipedia.org/w/index.php?title=2-Acrylamido-2-methylpropane_sulfonic_acidoldid=1018358974".
International Search Report and Written Opinion issued Nov. 25, 2022 for related International Application No. PCT/US2022/074757.

* cited by examiner

*Primary Examiner* — Kumar R Bhushan
(74) *Attorney, Agent, or Firm* — Hogan Lovells US LLP

(57) ABSTRACT

A low-end rheology modifier for adjusting rheological characteristics of water-based drilling fluid systems, particularly for high salt, high density drilling fluids in high temperature and high-pressure applications. The low end rheology modifier comprises a copolymer and laponite clay, the copolymer comprising tert-Butylacrylamidosulfonic acid (TBAS) and n-vinylpyrrolidone (NVP) crosslinked with N,N'-Methylenebis(acrylamide).

11 Claims, 3 Drawing Sheets

HIGH TEMPERATURE HIGH SALT LOW END RHEOLOGY MODIFIERS

TECHNICAL FIELD

This disclosure relates to low-end rheology modifiers for high performance water-based drilling fluids. More specifically, this disclosure relates to crosslinked high molecular weight copolymer comprising tert-Butylacrylamidosulfonic acid (TBAS) and n-vinylpyrrolidone (NVP) coupled with a laponite clay product to act as low-end rheology support for a water-based drilling fluids system, particularly for high salt, high density drilling fluids in high temperature and high-pressure applications.

BACKGROUND

Subterranean deposits of natural resources such as gas, water, crude oil, and thermal energy are commonly recovered by drilling wellbores to tap subterranean formations or zones containing such deposits. A drilling fluid or mud is a specially designed fluid that is circulated through a wellbore as the wellbore is being drilled to facilitate the drilling operation. Drilling muds can be broadly classified into water-based muds (WBMs), oil-based muds (OBMs), and foam-drilling fluids.

The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation. To perform these functions, an efficient drilling fluid must exhibit numerous characteristics, such as desired rheological properties (for example, plastic viscosity, yield point and low-end rheology, gel strengths), fluid loss prevention, stability under various temperature and pressure operating conditions, stability against contaminating fluids, such as aqueous sodium and calcium salts, cement, and other contaminating fluids, etc.

Drilling fluids used during operations are often exposed to a range of temperatures as the drilling fluid moves from the surface to the target zone. For example, a drilling fluid moving through a drill string or pipe from a platform structure through water to then drill through the Earth's crust (an approximate combined depth of 30,000-40,000 feet) may experience temperatures ranging from 35 degrees Fahrenheit to 450 degrees Fahrenheit. Drilling fluids are designed to display a set of rheological characteristics that are suitable for a particular operation. One of the challenges to the use of drilling fluids is the maintenance of desirable rheological characteristics over the range of environmental conditions to which the fluids are exposed. Thus, an ongoing need exists for improved drilling fluids for use in challenging geographic areas.

SUMMARY

The instant application discloses a low-end rheology modifier that can be used for adjusting rheological characteristics of a water-based drilling fluid.

In one example, the low-end rheology modifier comprises a laponite clay. In another example, the low-end rheology modifier further comprises a copolymer. In one example, the copolymer comprises tert-Butylacrylamidosulfonic acid (TBAS) monomer. In another example, the copolymer further comprises n-vinylpyrrolidone (NVP) monomer. In yet another example, the copolymer further comprises a cross-linking monomer. In one example, the cross-linking monomer is N,N'-Methylenebis(acrylamide).

In one example, the low-end rheology modifier described herein comprises a laponite clay in an amount ranging from 50 mass % to 67 mass %.

In another example, the low-end rheology modifier comprises a copolymer in an amount ranging from 33 mass % to 50 mass %.

In one example, the copolymer comprises tert-Butylacrylamidosulfonic acid (TBAS) monomer in an amount ranging from 60 mol % to 80 mol %.

In another example, the copolymer further comprises n-vinylpyrrolidone (NVP) monomer in an amount ranging from 20 mol % to 40 mol %.

In yet another example, the copolymer further comprises a cross-linking monomer in an amount ranging from 1000 ppm to 3000 ppm.

In yet another example, the copolymer comprises tert-Butylacrylamidosulfonic acid (TBAS) monomer and n-vinylpyrrolidone (NVP) monomer in a mole ratio ranging from 1.5 to 4.

In one example, the low-end rheology modifier comprises a copolymer and laponite in a mass ratio ranging from 1 to 2.

In one example, the low-end rheology modifier exhibits a higher thermal stability as compared to a mixture comprising attapulgite (or Palygorskite) and salt.

In one example, the concentration of the low-end rheology modifier as described herein ranges from 2 lbs/bbl to 5 lbs/bbl. In another example, the concentration/dosage of the low-end rheology modifier as described herein ranges from 5 $kg/m^3$ to 15 $kg/m^3$.

In one example, the viscosity of the low-end rheology modifier as described herein is measured at temperatures ranging from 392 degrees Fahrenheit to 464 degrees Fahrenheit. In another example, the viscosity of the low-end rheology modifier as described herein is measured at temperatures ranging from 200 degrees Centigrade to 240 degrees Centigrade.

In one example, the viscosity of the low-end rheology modifier as described herein is measured after aging at temperatures ranging from 120 degrees Fahrenheit to 464 degrees Fahrenheit. In another example, the viscosity of the low-end rheology modifier as described herein is measured after aging at temperatures ranging from 50 degrees Centigrade to 240 degrees Centigrade.

In one example, the viscosity of the low-end rheology modifier as described herein is measured after aging for a period ranging from 16 hrs to 18 hrs.

In one example, the application concentration of the low-end rheology modifier as described herein ranges from 5 $kg/m^3$ to 15 $kg/m^3$. In another example, the application concentration of the low-end rheology modifier as described herein ranges from 2 lb/bbl to 5 lb/bbl.

In one example, the low-end rheology modifier comprises: (i) a laponite clay, and (ii) a copolymer of tert-Butylacrylamidosulfonic acid (TBAS) monomer, n-vinylpyrrolidone (NVP) monomer, wherein the copolymer comprises a cross-linking monomer, N,N'-Methylenebis(acrylamide).

The instant application also discloses a water-based drilling fluid. In one example, the water-based drilling fluid composition comprises water and a low-end rheology modifier, said low-end rheology modifier comprising: (i) a laponite clay, and (ii) a copolymer of tert-Butylacrylamidosulfonic acid (TBAS) monomer, n-vinylpyrrolidone (NVP) monomer, wherein the copolymer comprises a cross-linking monomer, N,N'-Methylenebis(acrylamide).

The instant application further discloses a method for drilling or completing an oil or natural gas well employing a water-based drilling fluid described herein. In one example, the method comprises: (a) introducing a water-based drilling fluid into a well bore wherein the water-based drilling fluid comprises a low-end rheology modifier, said low-end rheology modifier comprising: (i) a laponite clay, and (ii) a copolymer of tert-Butylacrylamidosulfonic acid (TBAS) monomer, n-vinylpyrrolidone (NVP) monomer, wherein the copolymer comprises a cross-linking monomer, N,N'-Methylenebis(acrylamide), and (b) drilling or completing the oil or gas well.

DETAILED DESCRIPTION

Figure 1A:
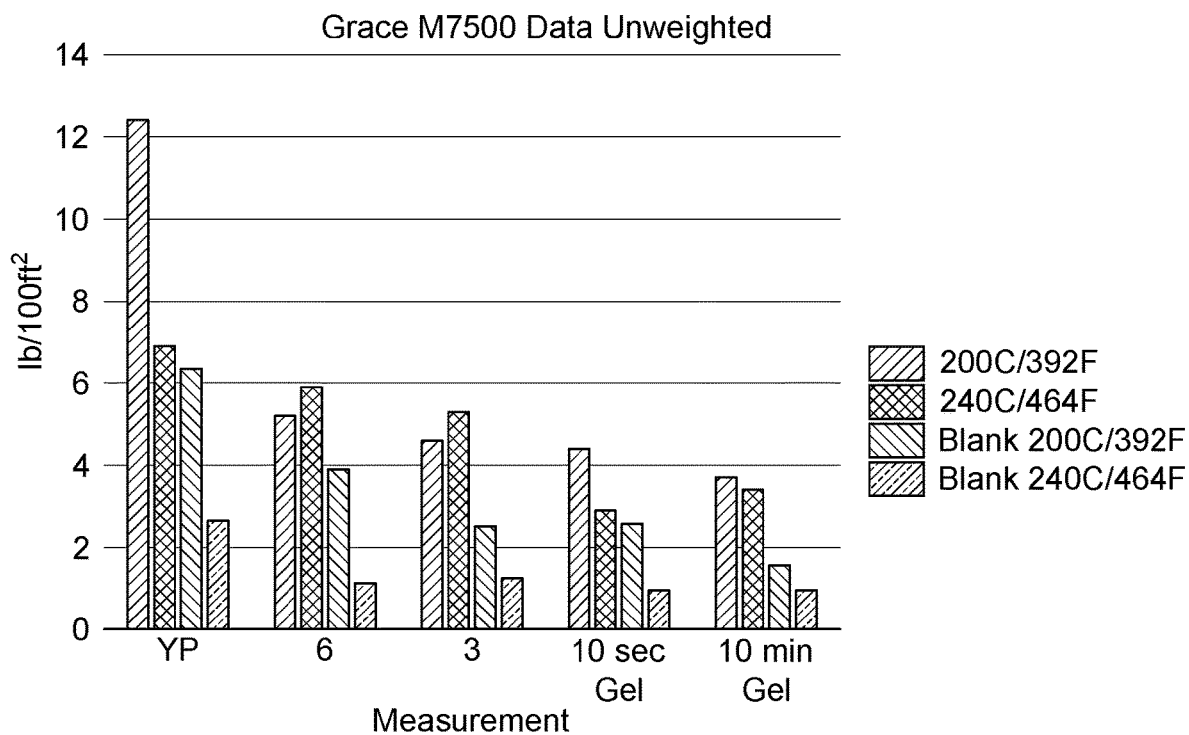
FIG. 1A shows the viscosity of unweighted 15% NaCl mixture after aging at 464 degrees Fahrenheit for 16 hours measured using Grace M7500 high-temperature, high-pressure rheometer according to Example 1.

While this specification concludes with claims particularly pointing out and distinctly claiming that, which is regarded as the invention it is anticipated that the invention can be more readily understood through reading the following detailed description of the invention and study of the included examples.

By the term "comprising" herein is meant that various optional, compatible components can be used in the compositions herein, provided that the important ingredients are present in the suitable form and concentrations. The term "comprising" thus encompasses and includes the more restrictive terms "consisting of" and "consisting essentially of" which can be used to characterize the essential ingredients such as water, pH modifier, rheology modifier (RM), fluid loss additive (FLA), AND weighting agent.

All percentages, parts, proportions and ratios as used herein, are by weight of the total composition, unless otherwise specified. All such weights as they pertain to listed ingredients are based on the active level and, therefore; do not include solvents or by-products that may be included in commercially available materials, unless otherwise specified.

All references to singular characteristics or limitations of the present invention shall include the corresponding plural characteristic or limitation, and vice-versa, unless otherwise specified or clearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

As used herein, the words "preferred," "preferably" and variants refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

References herein to "one embodiment," "one aspect" or "one version" or "one objective" of the invention include one or more such embodiment, aspect, version, or objective, unless the context clearly dictates otherwise.

As used herein, "low-end rheology modifier" or "LERM" refers to an additive that is placed in a drilling fluid to support the drilling fluid when it is flowing at the low sheer viscosity for the lower bit-rotation or lower circulation speeds. There are 4 measurements that are measured to determine the level of support a LERM provides to the drilling fluid. They are the "6 & 3-rpm" and the "10" and 10' Gels" (in other words, 10-second and 10-minutes Gels). If these 4 values are within acceptable ranges (usually >2.0 lb/100ft$^2$), the drilling fluid maybe relied upon to keep solids from settling to the bottom of the hole when the fluid is moving at slow rates or if circulation has completely stopped. Some rheology modifiers maybe relied upon to support all the levels measured (i.e., including 600, 300, 200 & 100-rpm) but either show no to inadequate ability to support the low-end or degrade after a certain temperature or rendered ineffective when salinity increases.

All publications, articles, papers, patents, patent publications, and other references cited herein are hereby incorporated herein in their entireties for all purposes to the extent consistent with the disclosure herein.

Generally, Yield Point (YP) is defined as the value obtained from the Bingham-Plastic rheological model when extrapolated to a shear rate of zero. It may be calculated using 600 rpm and 300 rpm shear rate readings as noted above on a standard oilfield rheometer, such as a FANN 35 or a FANN 75 rheometer. Plastic Viscosity (PV) is obtained from the Bingham-Plastic rheological model and represents the viscosity of a fluid when extrapolated to infinite shear rate.

The Grace Instrument M7500 Ultra HPHT Rheometer is a coaxial cylinder, rotational, high pressure, and high temperature rheometer. It is engineered to measure various rheological properties of fluids (including API HPHT tests) under a range of pressures and temperatures, up to 30,000 psi and 500 degrees Fahrenheit.

Conventional rheology modifiers are organic-based materials that degrade at higher temperatures like 400 degrees Fahrenheit. The instant application discloses composition and methods that help oil and gas drillers to control the low-end rheologies to support solids from settling and/or to modify the low-end rheologies for fluids that require a low shear viscosity at temperatures above 450 degrees Fahrenheit.

Currently, the low-end rheology polymers for water-based drilling fluids are not stable at high temperature. After aging at high temperature (>400 degrees Fahrenheit) for an extended period (18 hours), the viscosity of these polymer solution decreases significantly due to polymer degradation. This viscosity change will have several impacts on the drilling fluids' properties. Firstly, the fluid will partially lose the ability to lift and carry solids. Secondly, this viscosity change will change the rheology of the drilling fluid changing its ability to keep pressure on the bole-hole. In addition, the fluid loss characteristic of the drilling fluid may change as the viscosifying polymers often work synergistically with the fluid loss agents.

The inventors of the instant application, for the first time, demonstrated that crosslinked high molecular weight copolymer comprising a tert-Butylacrylamidosulfonic acid (TBAS) monomer and a n-vinylpyrrolidone (NVP) monomer coupled with a laponite clay product acted as a low-end rheology support for a water-based drilling fluids system, particularly for high salt, high density drilling fluids in high temperature and high-pressure applications. The inventors of the instant application, also for the first time, demonstrated that the copolymer comprising a crosslinking monomer, N,N'-Methylenebis(acrylamide), coupled with a laponite product had desirable viscosities after aging at 464 degrees Fahrenheit for 18 hours.

The instant application thus discloses low-end rheology modifier that are used for adjusting rheological characteristics of water-based drilling fluid systems.

In one example disclosed herein, the low-end rheology modifier comprises laponite clay and a copolymer. In one aspect of the embodiment disclosed herein, the copolymer is a high molecular weight copolymer. In another aspect of an embodiment disclosed herein, the copolymer comprises tert-Butylacrylamidosulfonic acid (TBAS) monomer. In yet another aspect of an embodiment disclosed herein, the copolymer comprises n-vinylpyrrolidone (NVP) monomer. In yet another aspect of an embodiment disclosed herein, the copolymer comprises a crosslinking monomer. In one aspect of an embodiment disclosed herein, the crosslinking monomer is N,N'-Methylenebis(acrylamide).

FIG. 1A compares the viscosity of unweighted 15% NaCl drilling fluid comprising a rheology modifier as described herein with the viscosity of a blank unweighted drilling fluid (i.e., that does not contain a rheology modifier as described herein). FIG. 1A highlights the advantages of the rheology modifier was aged in static aging cells at 464 degrees Fahrenheit for 16 hours, as measured by yield point (YP), 6 and 3 rpm speed, and 10-sec and 10-min gel strength.

Figure 1B:
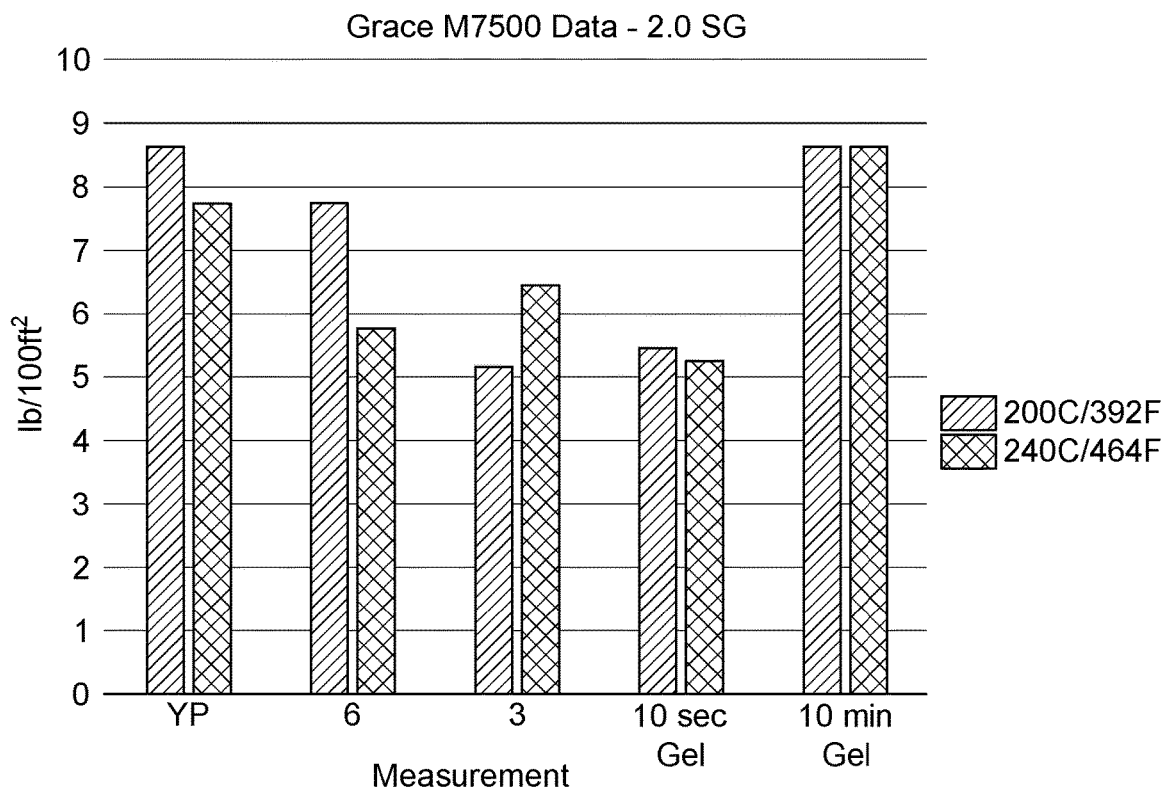
FIG. 1B shows the viscosity of weighted 15% NaCl (2.0 specific gravity) mixture after aging at 464 degrees Fahrenheit for 18 hours measured using Grace M7500 high-temperature, high-pressure rheometer according to Example 2.

FIG. 1B shows the viscosity of unweighted (with a 2.0 specific gravity) 15% NaCl drilling fluid comprising a rheology modifier as described herein. FIG. 1B compares the viscosity measure of a weighted drilling fluid comprising a rheology modifier that has been aged in static aging cells at 392 degrees Fahrenheit with that of a rheology modifier that has been aged in static aging cells at 464 degrees Fahrenheit.

Figure 2A:
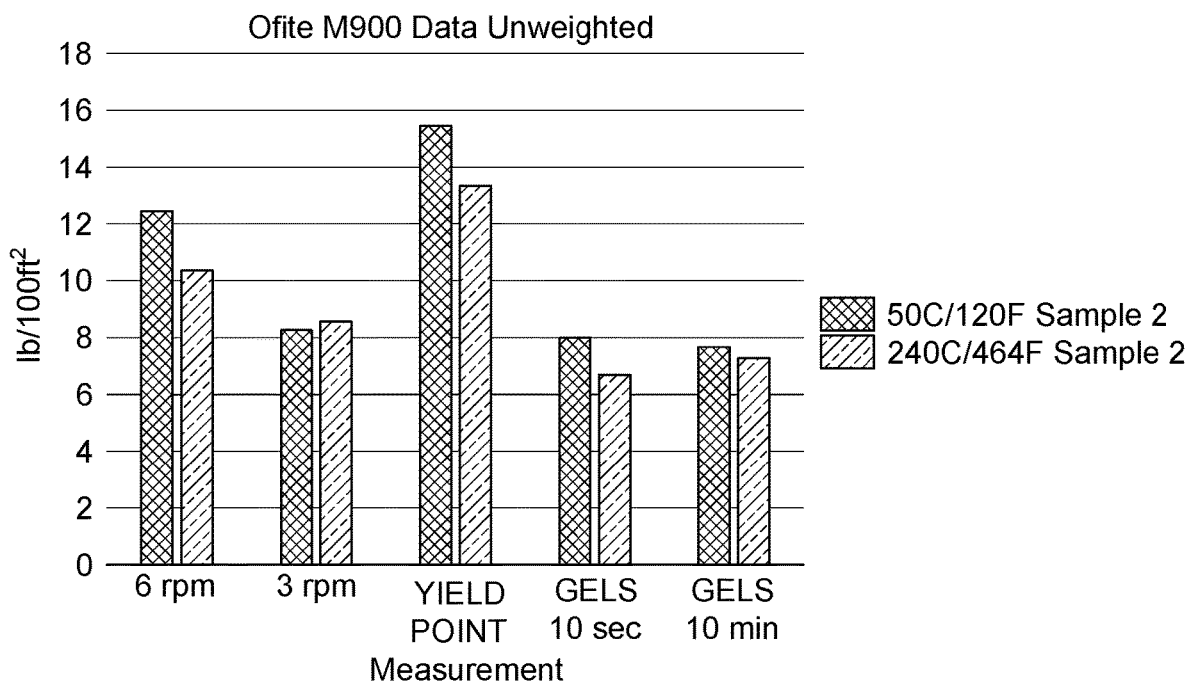
FIG. 2A shows the viscosity of unweighted 15% NaCl mixture before and after aging at 464 degrees Fahrenheit for 18 hours measured using Ofite M900 rheometer according to Example 3.
Figure 2B:
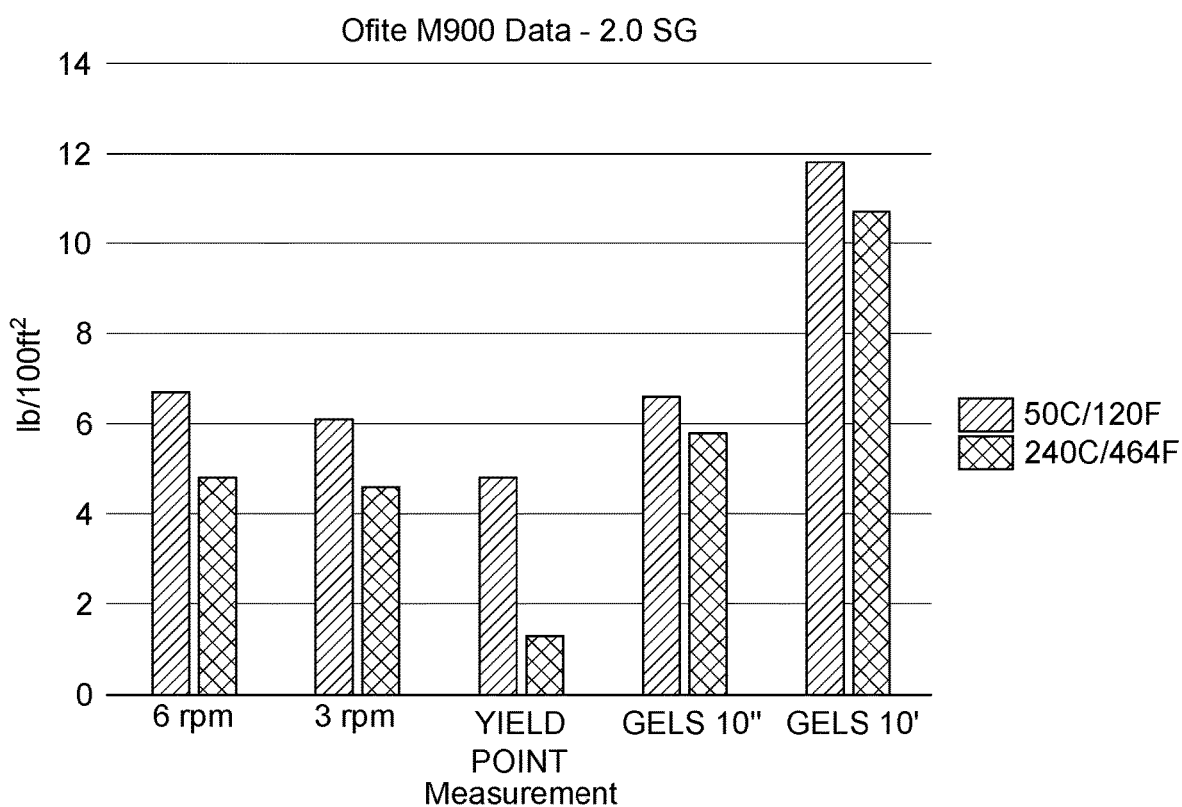
FIG. 2B shows the viscosity of weighted 15% NaCl (2.0 specific gravity) mixture before and after aging at 464 degrees Fahrenheit for 18 hours measured using Ofite M900 rheometer according to Example 4.

FIGS. 2A and 2B compares the viscosity of 15% NaCl unweighted mixture and 15% NaCl weighted mixture, respectively, before and after aging at 464° F. for 16 hours, as measured by yield point (YP), 6 and 3 rpm speed, and 10-sec and 10-min gel strength.

Figure 3:
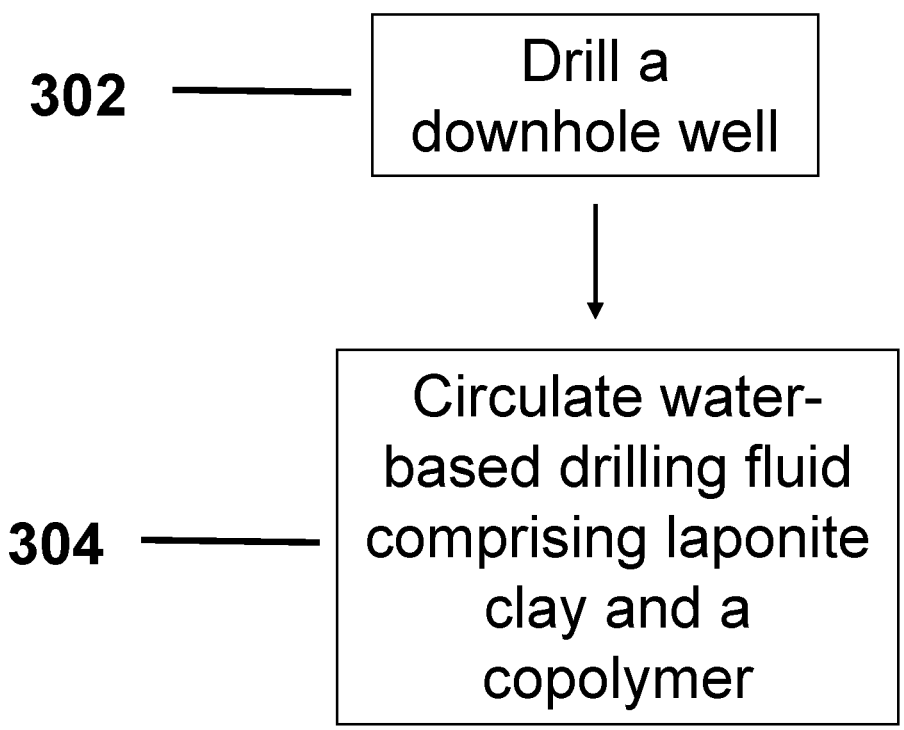
FIG. 3 shows a flowchart of a method 300 for improving or modifying rheological properties of a water-based drilling fluid during geothermal drilling operations.

FIG. 3 shows a flowchart of a method 300 for improving or modifying rheological properties of a water-based drilling fluid during geothermal drilling operations. Method 300 comprises step 302 of drilling a downhole well, and step 304 of pumping a water-based drilling fluid into the well while drilling, the water-based drilling fluid comprising a low-end rheology modifier, wherein the low-end rheology modifier comprises laponite clay and a copolymer. The presence of low-end rheology modifier in the water-based drilling fluid improves or modifies rheological properties of the water-based drilling fluid.

In one example, the instant application discloses a composition comprising laponite clay, and a copolymer; wherein the copolymer comprises tert-Butylacrylamidosulfonic acid (TBAS) and n-vinylpyrrolidone (NVP); and wherein the tert-Butylacrylamidosulfonic acid (TBAS) and the n-vinylpyrrolidone (NVP) are cross-linked with N,N'-Methylenebis(acrylamide).

In another example, the instant application discloses a low-end rheology modifier for water-based drilling fluid, the low-end rheology modifier comprising laponite clay, and a copolymer; wherein the copolymer comprises tert-Butylacrylamidosulfonic acid (TBAS) and n-vinylpyrrolidone (NVP); and wherein the tert-Butylacrylamidosulfonic acid (TBAS) and the n-vinylpyrrolidone (NVP) are cross-linked with N,N'-Methylenebis(acrylamide).

EXAMPLES

Example

Drilling fluid, unweighted, comprising of 15% wt NaCl, attapulgite, rheology modifier comprising polymer-laponite at a mass ratio of 1:2, with an overall concentration of rheology modifier to fluid being approximately 3 ppb was aged in static aging cells at 464 degrees Fahrenheit for 18 hours, and the viscosity of the drilling fluid was measured using Grace M7500 high-temperature, high-pressure rheometer. The results are shown in Table 1 below.

TABLE 1

| Temp(° F.) | Temp(° C.) | Pressure(psi) | Measurement | lb/100 ft$^2$ |
| --- | --- | --- | --- | --- |
| 386 | 197 | 2079 | YP | 12.4 |
| 384 | 196 | 2123 | 6 rpm | 5.2 |
| 386 | 197 | 2050 | 3 rpm | 4.6 |
| 392 | 200 | 2153 | 10 sec Gel | 4.4 |
| 394 | 201 | 2342 | 10 min Gel | 3.7 |
| 455 | 235 | 2040 | YP | 6.9 |
| 462 | 239 | 2060 | 6 rpm | 5.9 |
| 464 | 240 | 1975 | 3 rpm | 5.3 |
| 467 | 242 | 2011 | 10 sec Gel | 2.9 |
| 472 | 244 | 1949 | 10 min gel | 3.4 |

The viscosity of the unweighted blank (without sample) was also measured using the Grace M7500HTHP rheometer. Results are shown in Table 2 below.

TABLE 2

| Temp(° F.) | Temp(° C.) | Pressure(psi) | Measurement | lb/100 ft$^2$ |
| --- | --- | --- | --- | --- |
| 385 | 196 | 2071 | YP | 6.34 |
| 392 | 200 | 2011 | 6 rpm | 3.89 |
| 392 | 200 | 1981 | 3 rpm | 2.53 |
| 389 | 198 | 1972 | 10 sec Gel | 2.58 |
| 401 | 205 | 2059 | 10 min Gel | 1.57 |
| 453 | 234 | 2092 | YP | 2.64 |
| 465 | 241 | 2148 | 6 rpm | 1.13 |
| 468 | 242 | 2028 | 3 rpm | 1.25 |
| 471 | 244 | 1965 | 10 sec Gel | 0.96 |
| 465 | 241 | 2031 | 10 min Gel | 0.96 |

The results presented in Table 1 and Table 2 are illustrated in FIG. 1A, which shows side-by-side comparison of yield point (YP), 6 and 3 rpm speed, and 10-sec and 10-min gel strength.

Example

A drilling fluid was mixed with the following parameters: weighted (2.0 specific gravity), comprising of 15% wt NaCl, rheology modifier comprising polymer-laponite at a mass ratio of 1:2. The drilling mud with an overall concentration of rheology modifier to mud being approximately 3 ppb, pH modifier, $O_2$ scavenger($Na_2SO_3$), and defoamer, was aged in static aging cells at 464 degrees Fahrenheit for 16 hours, and the viscosity of the drilling fluid was measured using Grace M7500 high-temperature, high-pressure rheometer. The results are shown in Table 3 below.

TABLE 3

| Temp(° F.) | Temp(° C.) | Pressure(psi) | Measurement | lb/100 ft² |
|---|---|---|---|---|
| 381 | 194 | 2135 | YP | 8.7 |
| 393 | 201 | 2075 | 6 rpm | 7.8 |
| 396 | 202 | 2005 | 3 rpm | 5.2 |
| 395 | 202 | 2120 | 10 sec Gel | 5.5 |
| 401 | 205 | 1971 | 10 min Gel | 8.7 |
| 454 | 234 | 2058 | YP | 7.8 |
| 458 | 237 | 2138 | 6 rpm | 5.8 |
| 461 | 238 | 2026 | 3 rpm | 6.5 |
| 465 | 241 | 2095 | 10 sec Gel | 5.3 |
| 469 | 243 | 1980 | 10 min Gel | 8.7 |

The results presented in Table 3 are illustrated in FIG. 1B, which shows side-by-side comparison of yield point (YP), 6 and 3 rpm speed, and 10-sec and 10-min gel strength.

Example

Drilling fluid, unweighted, comprising the 15% wt NaCl, attapulgite, rheology modifier comprising polymer-laponite at a mass ratio of 1:2. The drilling mud with an overall concentration of rheology modifier to mud being approximately 3 ppb, pH modifier, $O_2$ scavenger($Na_2SO_3$), and defoamer was prepared. Viscosity, before and after aging, was measured at 464° F. for 16 hours. The viscosity data is shown in Table 4 below.

TABLE 4

| | Comparing Units in table are lb/100 ft² | | | |
|---|---|---|---|---|
| F. | 120° F. | 464° F. | 120° F. | 464° F. |
| Lbs/100 ft² | Rep 1 | | Rep 2 | |
| 6 rpm | 12.5 | 9.5 | 12.5 | 10.4 |
| 3 rpm | 8.3 | 6.9 | 8.3 | 8.6 |
| YIELD POINT | 16.0 | 11.3 | 15.5 | 13.4 |
| GELS 10 sec | 7.1 | 7.4 | 8.0 | 6.7 |
| GELS 10 min | 7.2 | 7.8 | 7.7 | 7.3 |

The results presented in Table 4 are illustrated in FIG. 2A, which shows side-by-side comparison of yield point (YP), 6 and 3 rpm speed, and 10-sec and 10-min gel strength.

Example

Drilling fluid, weighted (which includes Barite as a weighting agent in drilling fluids to make the mud heavier to a specific gravity of roughly 2.0), comprising the 15% wt NaCl, rheology modifier comprising polymer-laponite at a mass ratio of 1:2. The drilling mud with an overall concentration of rheology modifier to mud being approximately 3 ppb, pH modifier, $O_2$ scavenger ($Na_2SO_3$), and defoamer, was prepared. Viscosity, before and after aging, was measured at 464 degrees Fahrenheit for 16 hours. The viscosity data is shown in Table 5 below.

TABLE 5

| Rheology | BHR 120° F. | AHR 464° F. |
|---|---|---|
| pH | >10 | >10 |
| 6 rpm | 6.7 | 4.8 |
| 3 rpm | 6.1 | 4.6 |
| YIELD POINT | 4.8 | 1.3 |
| GELS 10" | 6.6 | 5.8 |
| GELS 10' | 11.8 | 10.7 |

Units in table are lb/100 ft²

The results presented in Table 5 are illustrated in FIG. 2B, which shows side-by-side comparison of yield point (YP), 6 and 3 rpm speed, and 10-sec and 10-minsec gel strength.

Example

In one example, disclosed herein is a method for improving or modifying rheological properties of a water-based drilling fluid during geothermal drilling operations, the method comprising: drilling a downhole well, and pumping a water-based drilling fluid into the well while drilling, the water-based drilling fluid comprising a low-end rheology modifier; wherein the low-end rheology modifier comprises laponite clay and a copolymer and wherein the presence of the low-end rheology modifier improves or modifies the rheological properties of the water-based drilling fluid in the well.

According to one example, the method disclosed herein comprises the laponite clay in a mass ranging from 50 mass % and 67 mass %.

According to another example, the method disclosed herein comprises the copolymer in an amount ranging from 33 mass % and 50 mass %.

According to another example, the method disclosed herein comprises a copolymer wherein the copolymer comprises: a tert-Butylacrylamidosulfonic acid (TBAS) monomer, an n-vinylpyrrolidone (NVP) monomer, and a cross-linking monomer, wherein the cross-linking monomer is N,N'-Methylenebis(acrylamide). In one example, the tert-Butylacrylamidosulfonic acid (TBAS) monomer is present in an amount ranging from 60 mol % to 80 mol %. In another example, the n-vinylpyrrolidone (NVP) monomer in an amount ranging from 20 mol % to 40 mol %. In another example, the cross-linking monomer is present in an amount ranging from 1000 ppm to 3000 ppm.

Although the polymers and processing methodologies of the present disclosure have been described with reference to specific exemplary embodiments thereof, the present disclosure is not to be limited to such exemplary embodiments. Rather, as will be readily apparent to persons skilled in the art, the teachings of the present disclosure are susceptible to many implementations and/or applications, without departing from the scope of the present disclosure. Indeed, modifications and/or changes in the selection of specific polymers, polymer ratios, processing conditions, and end-use applications are contemplated hereby, and such modifications and/or changes are encompassed within the scope of the present invention as set forth by the claims which follow.

We claim:
1. A water-based drilling fluid, comprising:
a low-end rheology modifier comprising laponite clay and a copolymer, wherein the laponite clay is present in the low-end rheology modifier in amounts of 50 mass % to 67 mass %, and wherein the copolymer comprises:
- a tert-Butylacrylamidosulfonic acid (TBAS) monomer;
- an n-vinylpyrrolidone (NVP) monomer; and
- a cross-linking monomer, wherein the cross-linking monomer is N,N'-Methylenebis(acrylamide), wherein the low-end rheology modifier is capable of increasing viscosity of the water-based drilling fluid at temperatures of above 450 degrees Fahrenheit.

2. The water-based drilling fluid according to claim 1, wherein the laponite clay and the copolymer are present in the low-end rheology modifier in a mass ratio of 2:1.

3. The water-based drilling fluid according to claim 1, wherein the TBAS monomer of the copolymer is present in the low-end rheology modifier in an amount of 60 mol % to 80 mol %.

4. The water-based drilling fluid according to claim 1, wherein the NVP monomer of the copolymer is present in the low-end rheology modifier in an amount of 20 mol % to 40 mol %.

5. The water-based drilling fluid according to claim 1, wherein the cross-linking monomer of the copolymer is present in the low-end rheology modifier in an amount of 1000 ppm to 3000 ppm.

6. The water-based drilling fluid according to claim 1, wherein the copolymer is present in the low-end rheology modifier in an amount of 33 mass % to and 50 mass %.

7. The water-based drilling fluid according to claim 1, wherein the TBAS monomer of the copolymer is present in the low-end theology modifier in an amount of 65 mol % to 97 mol %.

8. The water-based drilling fluid according to claim 1, wherein the n-vinylpyrrolidone monomer of the copolymer is present in the low-end rheology modifier in an amount of 20 mol % to 35 mol %.

9. The water-based drilling fluid according to claim 1, wherein the crosslinking monomer of the copolymer is present in the low-end rheology modifier in an amount of 0.01% to 0.03%.

10. The water-based drilling fluid according to claim 1, wherein the low-end rheology modifier is present in the water-based drilling fluid in a concentration of 2 lbs/bbl to 5 lbs/bbl.

11. The water-based drilling fluid according to claim 1, wherein the low-end theology modifier is present in the water-based drilling fluid in a concentration of 5 kg/m$^3$ to 15 kg/m$^3$.

* * * * *